United States Patent [19]

Fujisawa et al.

[11] 4,055,136
[45] Oct. 25, 1977

[54] MULTI-CELL GAS-FILLED BAG AND METHOD FOR PRODUCING THE SAME

[75] Inventors: Masao Fujisawa, Chigasaki; Mitsugu Makise; Mamoru Kadono, both of Yokohama, all of Japan

[73] Assignee: Bridgestone Tire Company Limited, Tokyo, Japan

[21] Appl. No.: 672,358

[22] Filed: Mar. 31, 1976

[30] Foreign Application Priority Data

Apr. 2, 1975 Japan .................................. 50-39268

[51] Int. Cl.² ............................................. B63B 59/02
[52] U.S. Cl. ....................................... 114/219; 9/2 A; 9/11 A; 114/251; 150/.5; 156/289; 156/290
[58] Field of Search ............... 114/219, 235 R, 235 A, 114/249, 251; 9/2 A, 11 A; 150/.5, 1; 206/522; 52/2; 152/339, 340; 156/289, 290

[56] References Cited

U.S. PATENT DOCUMENTS

1,361,902  12/1920  Porteous .............................. 114/219
1,459,529   6/1923  Griffiths .............................. 152/339
1,992,514   2/1935  Taylor et al. ........................ 156/289
2,514,183   7/1950  Chandley ............................. 156/289
2,699,194   1/1955  Iknayan .............................. 156/289

Primary Examiner—Trygve M. Blix
Assistant Examiner—Sherman D. Basinger
Attorney, Agent, or Firm—Sughrue, Rothwell, Mion, Zinn and Macpeak

[57] ABSTRACT

A multi-cell gas-filled bag adapted for a dock fender, a connector for lighters and a float for supporting sand-flash pipe in reclaiming can be produced in a simple manner by uniting an inner sleeve made of an elastic rubber, and an outer sleeve made of an elastic rubber, each including a reinforcing material embedded therein, at a plurality of adhering circumferentially spaced longitudinal contact portions of the inner and outer sleeves, and introducing gas into non-adhering portions formed between adjacent adhering portions of the inner and outer sleeves to form cavities filled with the gas by the deformation of the inner sleeve.

5 Claims, 14 Drawing Figures

FIG_3

FIG_4a

FIG_9

FIG_10

MULTI-CELL GAS-FILLED BAG AND METHOD FOR PRODUCING THE SAME

The present invention relates to a multi-cell gas-filled bag and a method for producing the same.

The gas-filled bag means a bag having cavities tightly closed by a rubber outer shell in the interior of the bag, and is predominantly used as a buffering material after air or other gas is filled in the internal cavity. For example, the gas-filled bag is used as a gas-filled dock fender, a tension- and pressure-resistant connecting means which is advantageously used in the towing of lighters and the like on the water, and a float for supporting sand-flash pipes in the reclaiming.

Conventional gas-filled bags are merely formed of a rubber hollow shell. Therefore, conventional bags lose immediately the buffer function by puncture. While, in a composite gas-filled bag composed of a plurality of integrally bundled gas-filled bags, even when gas in the composite bag is exhausted, the bag cannot be collapsed flat and is disadvantageous in the transportation and storage. Moreover, individual gas-filling bags are produced by winding a rubber material around a core consisting mainly of gypsum while embedding a reinforcing material in the rubber material, vulcanizing the resulting bag, breaking the core and taking out the broken core from the resulting bag. Therefore, it is necessary to use one core in the production of one gas-filling bag, and the production of conventional gas-filling bag is not efficient and is expensive.

The object of the present invention is to provide a multi-cell gas-filled bag having a plurality of mutually independent gas-filled cavities and capable of being easily collapsed flat, which bag is advantageous in their transportation and storage and in being free from troubles in the bundling and in the uniting of a plurality of bags.

Another object of the present invention is to provide a simple method for producing such multi-cell gas-filled bag.

A feature of the present invention is the provision of a multi-cell gas-filled bag comprising an outer sleeve composed of an elastic rubber hollow cylinder including a tension-resistant reinforcing material embedded therein, and an inner sleeve composed of an elastic rubber hollow cylinder and inscribed and end sealed to said outer sleeve, said outer and inner sleeves being united with each other at a plurality of adhering portions spaced apart from each other in the circumferential direction of the sleeves and extending in the lengthwise direction thereof, to form gas-filled cavities formed by the deformation of the inner sleeve between adjacent adhering portions and between the outer and inner sleeves.

Another feature of the present invention is the provision of a method for producing multi-cell gas-filled bags comprising forming an inner sleeve composed of an elastic rubber hollow cylinder, effecting a pre-treatment for adhesion only at the belt-like portions on the outer peripheral surface of the inner sleeve, which belt-like portions divide the outer peripheral surface of the inner sleeve into a plurality of segment regions in the circumferential direction thereof, sticking the inner sleeve into an outer sleeve composed of an elastic rubber hollow cylinder including a tension-resistant reinforcing material embedded therein, at its axial ends sealably uniting the inner and outer sleeves at the belt-like portions and at their ends, and introducing gas into the segment regions to form cavities filled with the gas.

For a better understanding of the invention, reference is taken to the accompanying drawings, wherein.

Figures 1, 2:
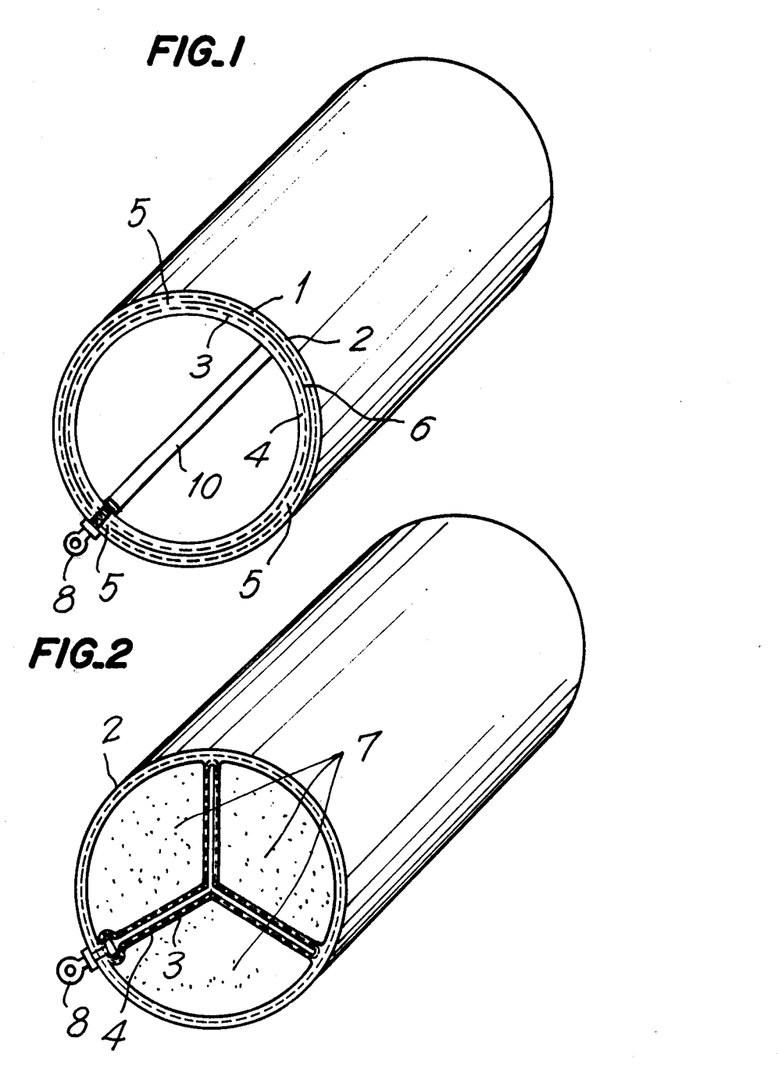
FIGS. 1 and 2 are perspective views, partly in section, of the multi-cell gas-filled bag according to the present invention before and after gas is filled in the bag, respectively.
Figure 3:
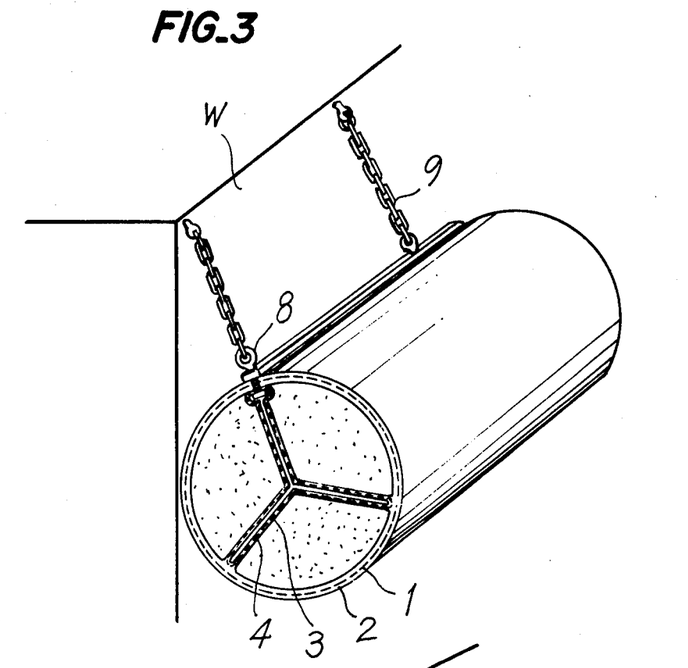
FIG. 3 is a perspective view of the bag shown in FIG. 1 in the use as a gas-filled dock fender.

Referring to FIGS. 1 and 2, in the multi-cell gas-filled bag of the present invention, an inner sleeve 4 composed of an elastic rubber hollow cylinder, which preferably includes a tension-resistant reinforcing material 3, such as tire cord or the like, is inscribed to an outer sleeve 2 composed of an elastic rubber hollow cylinder including a tension-resistant reinforcing material 1, such as tire cord or steel cord, embedded therein, and the inner sleeve 4 is divided into, for example, three parts by three adhering portions 5 spaced apart from each other in the circumferential direction of the sleeve 4 and extending in the lengthwise direction thereof, whereby three independent segment regions 6 are formed between adjacent adhering portions and between the outer and inner sleeves 2 and 4. When a gas, for example air, is filled in the three segment regions 6, the regions 6 deform to form sector-shaped cavities 7 filled with the gas between adjacent adhering regions and between the inner and outer sleeves as shown in FIG. 2. For this purpose, the outer sleeve 2 is provided with a gas-supply valve (not shown) communicated with each of the cavities 7. The outer sleeve 2 is provided with metal fittings 8 at the adhering portion 5 of the outer and inner sleeves and is suspended from a quay wall W through chains 9, and the bag air filled is used as a pneumatic dock fender. In FIG. 1, the numeral 10 is a rod threadedly engaged with the metal fittings 8.

In this pneumatic dock fender, when air in the cavity 7 is exhausted, the outer sleeve 2 and inner sleeve 4 are in contact with each other along this entire surface as shown in FIG. 1, and the dock fender can be collapsed into flat shape (not shown). Therefore, the pneumatic dock fender can be deformed into a compact shape which is very advantageous for transportation and storage.

Figure 4A:
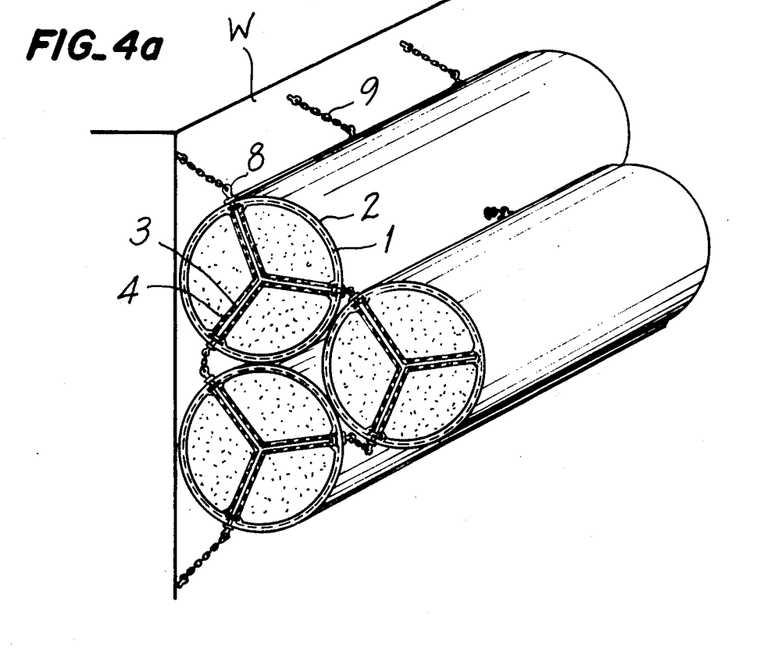
FIGS. 4a, 4b and 4c are diagrammatic views illustrating other embodiments of the bag according to the present invention in the use as a dock fender, respectively.
Figure 4B:
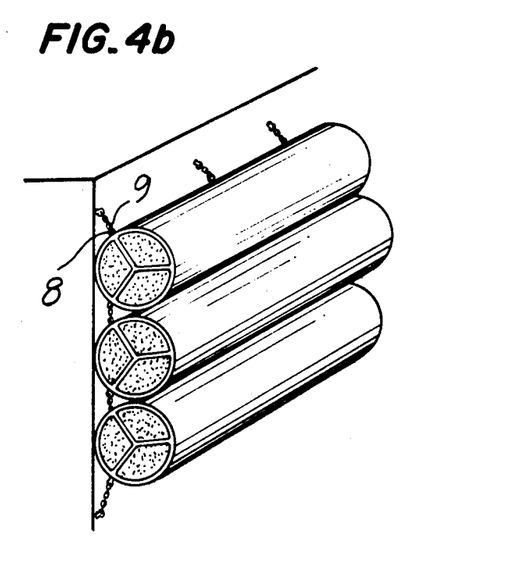
Figure 4C:
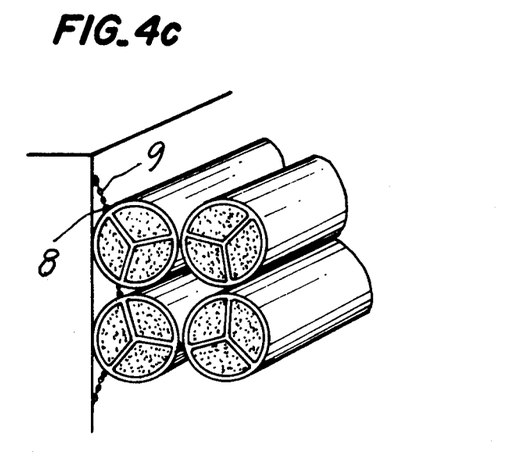

FIGS. 4a, 4b and 4c illustrate three embodiments wherein a plurality of the gas-filled bags of the present invention are used as a dock fender. In the embodiments shown in FIGS. 4a, 4b and 4c, the gas-filled bags are provided with two or more of metal fittings 8 at their periphery except on the mooring side of the resulting dock fender, and a plurality of bags are connected with each other so that the dock fender is prevented from jumping up and is made freely movable. As a result, when ships are moored to a quay, the dock fender can suppress an increase of the external force subjected thereto and increase its absorption energy.

Figure 5:
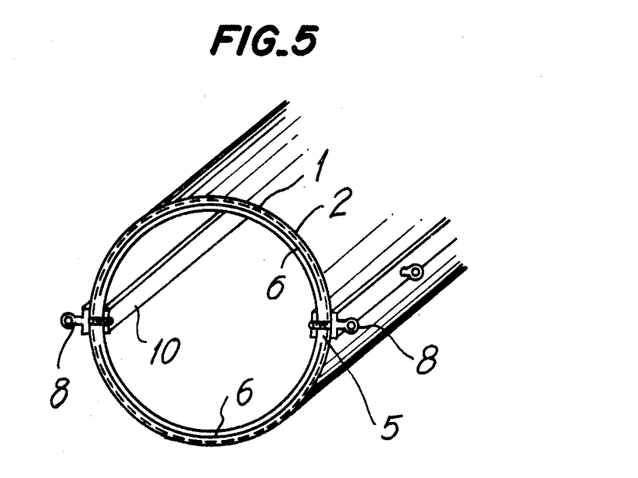
FIGS. 5 and 6 are perspective views, partly in section, of the bag according to the present invention in the use as a connecting means before and after gas is filled in the bag, respectively.
Figure 6:
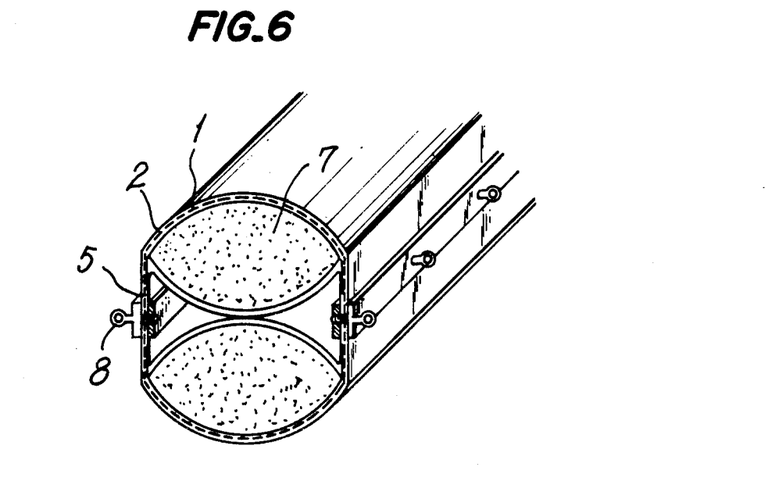
Figure 7:
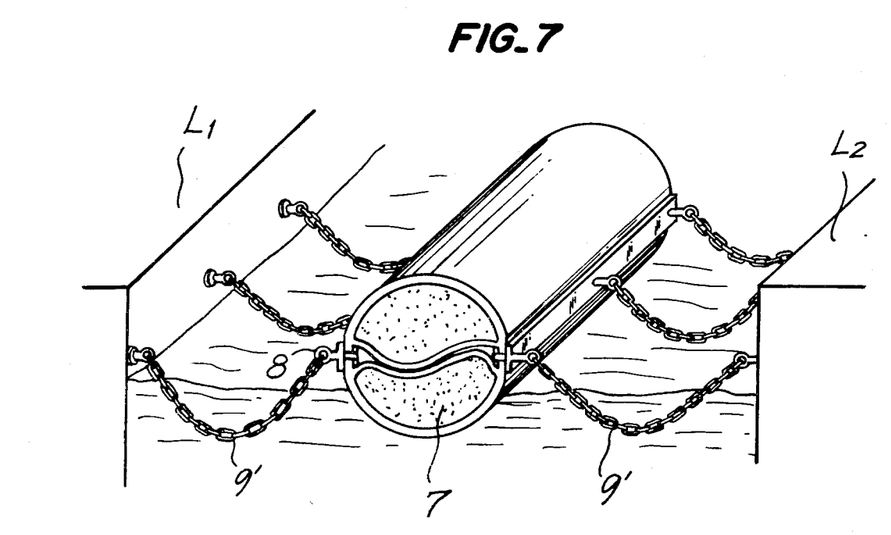
FIGS. 7 and 8 are perspective views illustrating the operating condition of the bag shown in FIGS. 5 and 6 in the use as a connecting means, respectively.
Figure 8:
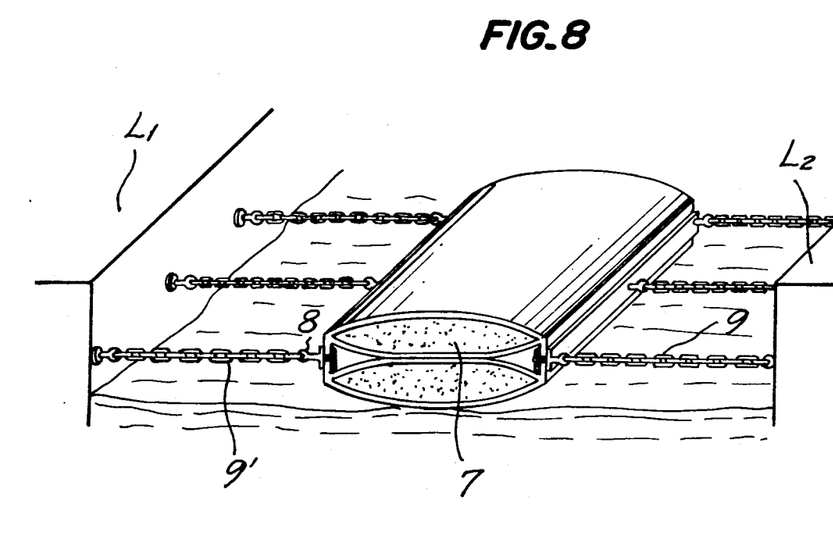

FIGS. 5 and 6 illustrate the use of the gas-filled bag according to the present invention as a connecting means of lighters towed on the water. In this case, it is preferable to form two adhering portions 5 in the bag at the positions, which divide the periphery of the bag into two equal parts as shown in FIGS. 5 and 6. Metal fittings 8 are provided to each of the adhering portions 5, and a gas, for example air, is filled in the segment regions 6 to deform the regions into air-filled cavities 7 as shown in FIG. 6. When the air-filled bag is connected to lighters $L_1$ and $L_2$ through chains 9' as shown in FIGS. 7 and 8, the lighters $L_1$ and $L_2$ can be smoothly towed by the buffer action of the bag against compression and tension. That is, not only when the bag is compressed between the lighters $l_1$ and $l_2$, but also when the bag is subjected to tension as shown in FIG. 8, air filled in the cavity 7 is compressed and develops a buffer action.

Figure 9:
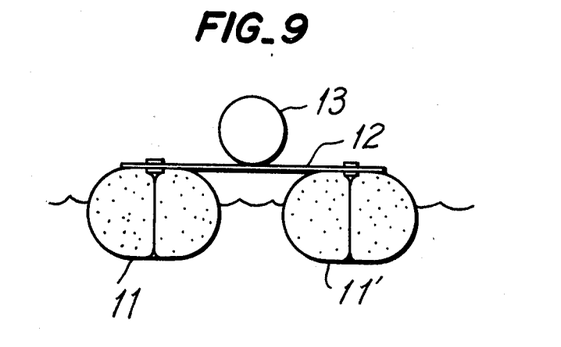
FIG. 9 is a diagrammatic view of the bag according to the present invention in the use as a float.
Figure 10:
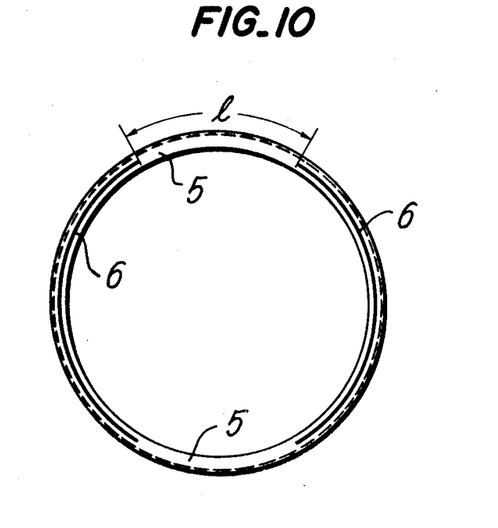
FIG. 10 is a cross-sectional view illustrating a preferred embodiment of the bag shown in FIG. 9.
Figure 11:
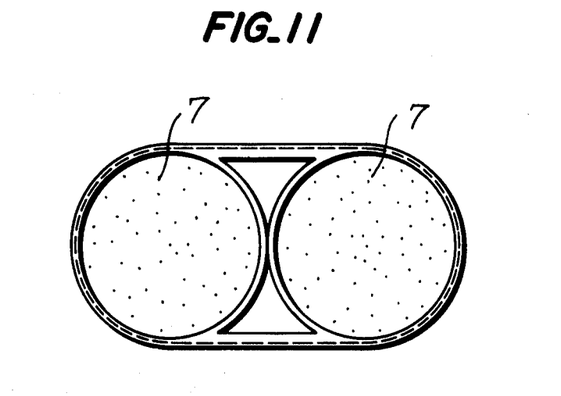
FIG. 11 is a cross-sectional view of the bag shown in FIG. 10 after gas is filled in the bag.
Figure 12:
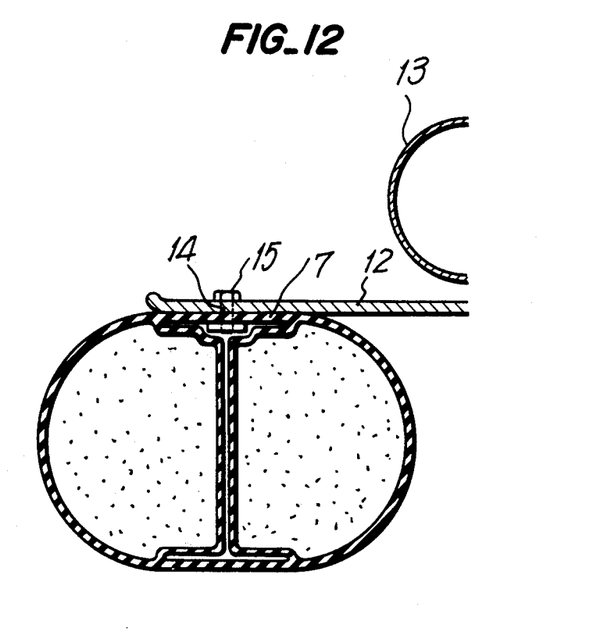
FIG. 12 is a diagrammatic view illustrating the connecting portion of the float and the supporting member in FIG. 9.

FIG. 9 shows the use of the gas-filled bag of the present invention as a float for supporting a sand-flash pipe used in reclaiming. Gas-filled bags 11 and 11' are fixed to both ends of a supporting member 12, and a sand-flash pipe 13 is disposed on the center of the supporting member 12. FIG. 10 shows the cross-section of a bag preferably used as a float of this kind. The length of the adhering portion 5 is preferred to be rather short. That is, when air is filled in a pair of the segment regions 6, a pair of the resulting air-filled cavities 7 are united so that the cavities 7 make contact with each other under pressure so as to be repelled from each other, to form a pneumatic bag as shown in FIG. 11. For this purpose, it is necessary that the length $l$ of the adhering portion 5 is at most $1/(\pi+2)$ times (that is, 0.19 times) of the total circumferential length of the inner sleeve 4. In the bag shown in FIGS. 9 and 12, the length $l$ of the adhering portion 5 is somewhat smaller than the length calculated from the formula. The float is fixed to the supporting member 12 by means of a bolt 14 and a unit 15 through the adhering portion 5.

In all of the above described embodiments, both ends of the segment region 6 are hermetically sealed similarly to the toothpaste tube end in order that the gas-filled bag is advantageously collapsed into a flat shape when the bag is not used.

The multi-cell gas-filled bag according to the present invention is produced in the following manner. A releasing agent is applied to a cylindrical metal mold, and a rubber sheet is wound around the metal mold to form an inner sleeve. Alternatively, a metal mold is inserted into a hollow rubber cylinder during extrusion from an extruder to form an inner sleeve. Then, a releasing agent is applied to the outer surface of the inner sleeve at the segment region 6 except both ends thereof, along the lengthwise direction of the sleeve. The adhering belt-like portion 5 and both ends of the segment region 6 are subjected to a pre-treatment for adhesion. One end of the segment region 6 is provided with a gas-supply valve. Then, a rubber sheet, a tension-resistant reinforcing material 1, such as tire cord or the like, and if necessary a rubber sheet, are wound in order around the inner sleeve, and a cloth is tightly wound around the assembly, and then the resulting assembly is vulcanized in a vulcanizing vessel. After the vulcanization, the cloth is unwound, and the metal mold is removed. When a gas, for example air, is introduced into the segment region 6 through the above-described gas-supply valve, the segment region 6 can be filled with air.

Further, the gas-filled bag can be produced in the following manner. As inner sleeve formed by winding a rubber sheet or an inner sleeve formed of a rubber hollow cylinder extruded from an extruder is pressed to deform it into belt-like flat shape, the adhering portion 5 and the segment region 6 are subjected to the same treatment as described above, a rubber sheet, a tension-resistant reinforcing material 1 and the like are wound around the above treated inner sleeve, the resulting belt-like flat assembly is vulcanized, and then a gas, for example air, is filled in the segment region 6.

When the bag of the present invention is not used, the bag can be collapsed into compact flat shape by exhaust gas, for example air, filled in the bag. Therefore, the bag is advantageous in the transportation and storage in the limited spaces, such as ship and the like. Moreover, the bag can be produced without the use of a core, such as gypsum, and without the troublesome treatments to break the core and to take out the broken core. Therefore, gas-filled bags adapted for various uses can be easily produced.

What is claimed is:

1. A multi-cell gas-filled bag comprising: an outer sleeve composed of an elastic rubber cylinder having a tension-resistant reinforcing material embedded therein, an inner concentric sleeve of substantially the same length as said outer sleeve composed of an elastic hollow cylinder having a tension-resistant reinforcing material embedded therein, said inner and outer sleeves united with each other at their ends and at a plurality of adhering portions extending longitudinally of and being equally spaced around said sleeves such that the inner surface of the outer sleeve is divided into equal segment regions, and is adapted to form gas-filled cavities, each cavity having an indcpendent partition wall formed by the deformation of the inner sleeve between adjacent adhering portions in the longitudinal direction and between adhering portions at both ends of said inner and outer sleeves.

2. The bag of claim 1 wherein the number of said spaced adhering portions is three.

3. A method for producing multi-cell gas-filled bags comprising the steps of:
   forming an inner cylindrical sleeve composed of an elastic rubber, hollow cylinder having tension-resistant reinforcing material embedded therein,
   pre-treating the outer surface of the inner sleeve along circumferentially spaced, belt-like portions, and around its ends uniting the inner sleeve to an outer sleeve of essentially the same dimension which concentrically surrounds the inner sleeve and is formed of an elastic rubber hollow cylinder including a tension-resistant reinforcing material embedded therein
   along said belt-like portions, and along said ends, and introducing a gas into the segment regions between said circumferentially spaced belt-like portions and said ends to form cavities filled with gas.

4. The method of claim 3 wherein a releasing agent is applied to a cylindrical metal mold, and a rubber sheet is wound around the metal mold to form the inner sleeve.

5. The method of claim 3 wherein a cylindrical metal mold is inserted into a rubber hollow cylinder during extrusion from an extruder to form the inner sleeve.

* * * * *